Patented Aug. 30, 1949

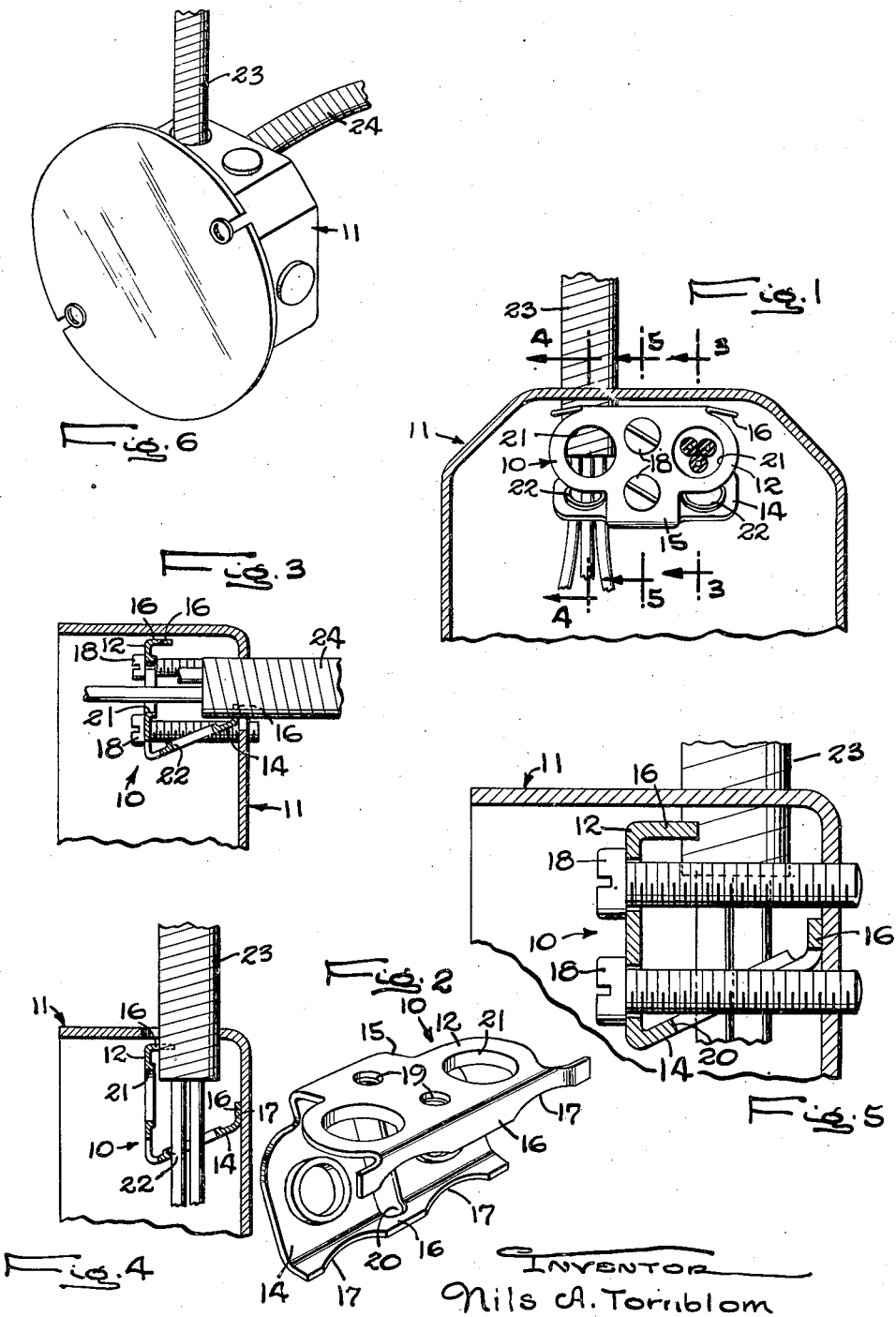

2,480,522

UNITED STATES PATENT OFFICE 2,480,522

CABLE CLAMP

Nils A. Tornblom, Chicago, Ill., assignor to Appleton Electric Company, Chicago, Ill., a corporation of Illinois Application May 11, 1948, Serial No. 26,465

1 Claim. (Cl. 285—24.5)

The present invention pertains to cable clamps for use in electric wiring system boxes.

The general aim of the present invention is to provide a new and simple clamp for securing an entering spiral armored cable in an outlet box or the like.

More particularly, it has been an object of this invention to devise such a clamp which can be secured effectually to cables entering from either or both of two adjacent walls of the box rather than from a single wall.

Further objects and advantages of the invention will become apparent as the following description proceeds, taken in connection with the accompanying drawing, in which:

Figure 1 is a plan view of a fragmentary portion of an outlet box having installed therein a clamp embodying the present invention.

Fig. 2 is a perspective view, on somewhat enlarged scale, of the clamp included in the installation of Fig. 1.

Figs. 3, 4 and 5 are detail sectional views taken respectively along substantially the lines 3—3, 4—4 and 5—5 in Fig. 1, Fig. 5 being on somewhat enlarged scale.

Fig. 6 is a perspective view of the outlet box with cover applied after installation of the cable clamp.

Although one particular embodiment of the invention has been shown and described in some detail, there is no intention to thereby limit the invention to the precise embodiment shown. On the contrary, the intention is to cover all modifications and alternative constructions falling within the spirit and scope of the invention as expressed in the appended claim.

Referring more particularly to the drawing, the invention has been shown therein as embodied in a cable clamp designated generally as 10 and shown as installed in a conventional outlet box 11. Such clamp comprises in the present instance a portion of sheet metal bent transversely intermediate its ends into a wide V so as to present two leg portions 12 and 14 disposed at an acute angle with respect to each other. The sheet metal member is notched out at the center of its side edges as indicated at 15 in Fig. 2 to facilitate its bending into the desired V shape.

Each of the leg portions 12 and 14 terminates in a corresponding inturned marginal clamping flange 16. These flanges are located substantially at right angles with respect to each other (see Fig. 5). Scallops or notches 17 are formed in the edges of the flanges to partially embrace the cable against which they are pressed when the clamp is in place.

A pair of machine screws 18 complete the clamp and secure it in position within the box 11 (see Figs. 1, 3 and 5). These screws pass through a corresponding pair of holes 19 in the clamp leg 12 (see Fig. 2) and extend adjacent the opposite leg 14. In fact, one of them passes through a slot 20 in the latter leg. The screws are threaded in suitable tapped holes in one of the box walls adjacent a corner or line of juncture between two box walls where the clamp is to be located. A pair of apertures 21 are provided in the clamp leg 12 and a similar pair 22 in the clamp leg 14. The edges of these holes are smoothly inturned to prevent abrasion of conductors which pass through them.

With the clamp illustrated, a total of four entering cables can be accommodated by the single clamp. Two can enter from one wall of the box and two from an adjacent wall. In the present instance a spiral armored cable 23 has been shown as entering a side wall of the box and a second spiral armored cable 24 entering through a rear or bottom wall. The usual knockouts are provided in the walls of the box 11 and are removed at appropriate points for entry of the cables.

In the installation shown the cable 23 enters beneath the clamping flange 16 on the clamp leg 12 while the other cable 24 passes beneath the clamping flange on the other clamp leg 14. The conductors from these respective cables pass through the opposed apertures 21 and 22.

To draw the clamp tight and secure the cables in place when thus located, one has only to take up on the screws 18. Upon so doing, the legs 12 and 14 of the V-shaped clamping member are progressively collapsed toward each other or, in other words, the V tends to close. During such motion the flange 16 on the leg 14 is pressed against the opposed box wall and can slide along the latter's inner face slightly in order to accommodate the collapsing motion of the V. The V-shaped member is made of readily distortable sheet metal. As a consequence of such collapsing motion of the V the clamping flanges 16 are drawn toward respective opposed box walls and clamp the underlying portions of the cables 23 and 24 securely in place (see Figs. 3 and 4). It is to be particularly noted that the clamping action is substantially equally effectual on cables entering the box from either or both of two walls disposed at right angles to each other.

From the foregoing it will be perceived that the cable clamp disclosed is not only effectual in operation but extremely simple and rugged in structure. The metal V can be die formed from sheet metal on a large scale production basis and the screws 18 can, of course, be standard. Moreover, the electrician requires nothing but the screwdriver customarily found in his kit to install and actuate the clamp.

I claim as my invention:

As an article of manufacture, a cable clamp for use in an outlet box or the like, comprising a sheet of distortable metal folded transversely intermediate its ends in a wide V to present two leg portions disposed at an acute angle with respect to each other, each of said legs terminating in a marginal clamping flange inturned to project substantially at right angles to each other, a screw passing through one of said legs normal to it and extending adjacent the other for threadable engagement with a wall of the box adjacent a corner of the latter toward which the V is faced to draw the V against such box wall with a collapsing motion of the V and thereby force said flanges into clamping engagement with cables entering the box through either or both of a pair of adjacent box walls which define said corner, and said legs being apertured for passage therethrough of conductors from the cables.

NILS A. TORNBLOM.

No references cited.